US005723208A

United States Patent [19]

Suzuki et al.

[11] Patent Number: 5,723,208

[45] Date of Patent: Mar. 3, 1998

[54] LAMINATED BASE FILM FOR PHOTOGRAPHIC FILM

[75] Inventors: Kenji Suzuki, Yokohama; Tsuyoshi Nagai; Koji Furuya, both of Sagamihara, all of Japan

[73] Assignee: Teijin Limited, Osaka, Japan

[21] Appl. No.: 495,616

[22] PCT Filed: Feb. 7, 1994

[86] PCT No.: PCT/JP94/00180

§ 371 Date: Aug. 3, 1995

§ 102(e) Date: Aug. 3, 1995

[87] PCT Pub. No.: WO95/16223

PCT Pub. Date: Jun. 15, 1995

[30] Foreign Application Priority Data

Dec. 7, 1993 [JP] Japan .................................... 5-306639

[51] Int. Cl.$^6$ .......................... B32B 27/36; B32B 27/06; G03C 1/795; G03C 1/81

[52] U.S. Cl. .......................... 428/216; 428/215; 428/323; 428/339; 428/480; 428/910; 430/533

[58] Field of Search .................................... 428/141, 480, 428/323, 910, 694 SL, 694 SG, 213, 694 ST, 215, 216, 339; 430/227, 523, 531, 533, 627, 934

[56] References Cited

U.S. PATENT DOCUMENTS

| | | | |
|---|---|---|---|
| 3,937,754 | 2/1976 | Shimotsuma et al. | 260/860 |
| 4,141,935 | 2/1979 | Shrader et al. | 96/75 |
| 4,198,458 | 4/1980 | Mitsuishi et al. | 428/212 |
| 5,076,977 | 12/1991 | Maier et al. | 264/25 |
| 5,270,160 | 12/1993 | Hiraoka et al. | 430/634 |
| 5,294,473 | 3/1994 | Kawamoto et al. | 428/141 |
| 5,360,408 | 11/1994 | Takada et al. | 430/496 |
| 5,372,925 | 12/1994 | Kobayashi et al. | 430/533 |
| 5,462,824 | 10/1995 | Kawamoto et al. | 430/501 |

FOREIGN PATENT DOCUMENTS

| | | |
|---|---|---|
| 0386450 | 9/1990 | European Pat. Off. . |
| 0572275 | 12/1993 | European Pat. Off. . |
| 48-40414 | 11/1973 | Japan . |
| 50-16783 | 2/1975 | Japan . |
| 50-81325 | 7/1975 | Japan . |
| 50-95374 | 7/1975 | Japan . |
| 50-109715 | 8/1975 | Japan . |
| 56-53745 | 12/1981 | Japan . |
| 62-3414 | 1/1987 | Japan . |
| 63-2982 | 1/1988 | Japan . |
| 1244446 | 9/1989 | Japan . |
| 1298350 | 12/1989 | Japan . |
| 3131843 | 6/1991 | Japan . |
| 444030 | 2/1992 | Japan . |
| 4235036 | 8/1992 | Japan . |
| 1476343 | 6/1977 | United Kingdom . |

*Primary Examiner*—Paul J. Thibodeau
*Assistant Examiner*—Vivian Chen
*Attorney, Agent, or Firm*—Sherman and Shalloway

[57] ABSTRACT

A laminated base film for a photographic film, (A) which is a laminated film comprising a first layer formed substantially of polyethylene-2,6-naphthalenedicarboxylate and a second layer formed substantially of a polymer composition containing a 2,6-naphthalenedicarboxylate unit

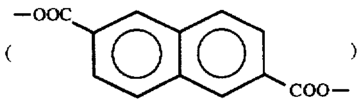

and an ethylene unit ($-CH_2CH_2-$) in a total amount of at least 50% by weight, and (B) which has a haze value of 3.0% or less, (C) in which the first layer has a plane orientation coefficient ($NS_1$) of 0.270 or less, and (D) in which the first layer thickness/second layer thickness ratio is in the range of from 3/7 to 7/3 wherein the laminated film has a curl degree $f_2$ in the longitudinal direction of 0 to 70%. This base film is provided with a proper curling which can be cured by the contraction of a photosensitive emulsion and has various suitable properties as a base film for a photographic film, such as transparency, lubricity, and the like.

14 Claims, No Drawings

LAMINATED BASE FILM FOR PHOTOGRAPHIC FILM

This application is a 371 of PCT/JP94/00180, filed Feb. 7, 1994, published as WO95/16223 Jun. 15, 1995.

TECHNICAL FIELD

The present invention relates to a laminated base film for a photographic film. More specifically, it relates to a laminated base film for a photographic film, comprising a first layer of a polyethylene-2,6-naphthalenedicarboxylate and a second layer of a polymer composition containing a 2,6-naphthalenedicarboxylate unit and an ethylene unit in a total amount of at least 70% by weight.

TECHNICAL BACKGROUND

Polyester films, particularly, films of polyethylene terephthalate, polyethylene-2,6-naphthalenedicarboxylate and a polyester composed mainly of these, have excellent properties in heat resistance, chemical resistance and mechanical properties so that they are used in many fields of magnetic tapes, photographs, electric, packages and drawings.

However, although polyester films have excellent mechanical properties, transparency and dimensional stability, they elongate and contract to a less degree relative to a change in temperature than a triacetylcellulose film which is generally used as a base for a photographic film. Therefore, when a photosensitive emulsion containing, as a main binder, a hydrophilic polymer such as gelatin is applied, they undergo curling due to the difference in elongation and contraction ascribed to the large elongation and contraction which the emulsion layer undergoes with a change in humidity. It is therefore a pending serious problem to overcome a curling-induced decrease in working efficiency in enlargement and printing.

In recent years, pocket cameras which are easy to carry about and handy are put to practical use, and it is therefore demanded to decrease the thickness of a photographic film for further miniaturize the cameras. As properties of the film for the above purpose, the film is required to have high mechanical strength, particularly high breaking strength. For this purpose, a polyethylene-2,6-naphthalenedicarboxylate film having excellent mechanical strength over a polyethylene terephthalate film is promising. However, polyethylene-2,6-naphthalenedicarboxylate has a defect in that it is liable to undergo interlaminar peeling in the thickness direction presumably because the polymer has a stiff structure.

Proposals for improving the curling properties by easing the curing of formed curl or proposals for improving the curling properties by decreasing the curling properties to prevent curling have been so far made as follows.

U.K. Patent 1,476,343 of which the priority is based on the two patent applications of Japanese Laid-open Patent Publication No. 50-16783 and Japanese Patent Publication No. 56-53745 discloses an oriented heat-set laminated film comprising a first crystalline aromatic polyester layer (A) formed on one surface of a laminate, a second crystalline aromatic polyester layer (B) formed on the other surface of the laminate and optionally a third crystalline aromatic polyester layer (C) formed between the above (A) layer and (B) layer, in which the aromatic polyester constituting the (A) layer has an intrinsic viscosity of 0.35 to 1.0, and the aromatic polyester constituting the (B) layer has an intrinsic viscosity of 0.37 to 1.0, the intrinsic viscosity being higher than that of the above aromatic polyester constituting the (A) layer by 0.02 to 0.5. It is disclosed that the above laminated film undergoes curling with the (A) layer outside and the (B) layer inside and gives a photographic film of which the curling is offset by the contraction of a photosensitive layer formed by applying the photosensitive layer to the (A) layer side.

Further, the following proposal for a base film for a photographic film, formed of a single layer, has been made.

Japanese Laid-open Patent Publication No. 50-81325 discloses a photographic film having, as a substrate film, a biaxially oriented polyethylene-2,6-naphthalenedicarboxylate film in which the ratio of Young's moduli in the longitudinal and transverse directions is in the range of 0.9 to 1.1, the saturated shrinkage percentage or saturated expansion percentage at 180° C. is 0.9% or less, the difference between the saturated shrinkage percentages or saturated expansion percentages in the longitudinal and transverse directions at 200° C. or lower is 0.4% or less, and the cloudiness is 4.5% or less.

Japanese Laid-open Patent Publication No. 50-95374 discloses a process for the production of a polyester film, comprising biaxial stretching, heat-setting and the subsequent heat-aging in the temperature range of 40° C. to 130° C. Its Example discloses a polyethylene-2,6-naphthalenedicarboxylate film having a thickness of 12 μm, obtained by biaxial stretching 4.3 times in the longitudinal direction and 3.5 times in the transverse direction, heat-setting at 200° C. and the subsequent aging at a temperature in the range of 40° to 130° C. for 24 hours.

Japanese Laid-open Patent Publication No. 50-109715 discloses a film for photography, having, at least as a substrate, a film which is formed of a polyester having an intrinsic viscosity (35° C., in o-chlorophenol) of at least 0.40, which contains at least 90 mol %, based on the total of constituting units, of ethylene-2,6-naphthalenedicarboxylate, which has a cloudiness of below 5%, and further which is biaxially oriented and heat-set.

U.S. Pat. No. 4,141,735 discloses a method of decreasing the core•set curling properties of a self-supported film which has a thickness of about 5 to 50 mil and is formed of a thermoplastic polymer having a Tg, measured by DSC at a heating rate of 20° K/minute, of higher than about 60° C., by heat treatment without substantially deforming or shrinking the film. This method is carried out by maintaining the film at a temperature between 30° C. and the Tg temperature of the above polymer at a relative humidity of 100% or less for about 0.1 to about 1,500 hours until the core•set curling properties decrease by at least 15%. The decrease in the core•set curling properties is measured by comparing the ANSI curl unit numerical change of a heat-treated film which has been through a core•setting on a core having an outer diameter of 3" at 49° C. at 50% RH for 24 hours with the ANSI curl unit numerical change of a corresponding film which has not been subjected to the above heat treatment but has been through the same core•setting.

Table 7 in Example 10 of the above U.S. patent shows temperatures for the heat treatment of a poly(ethylene-2,6-naphthalenedicarboxylate) film having a Tg of 198° C. and net ANSI curl values in the core•set curling properties, and it is shown that the net ANSI curl values were 18, 16, 13, 16, 20 and 25 at treatment temperatures of 60° C., 71° C., 100° C., 120° C., 149° C. and 180° C., respectively.

Japanese Laid-open Patent Publication No. 64-244446 discloses a photographic photosensitive material having a polyester base film having a haze value of 3% or less and a water content of at least 0.5% by weight and at least one photosensitive layer. This photosensitive material has its feature in that its base film has a water content of at least 0.5% by weight, and an aromatic dicarboxylic acid component having a metal sulfonate is copolymerized for obtaining the above water content.

DISCLOSURE OF THE INVENTION

It is an object of the present invention to provide a laminated base film for a photographic film.

It is another object of the present invention to provide a laminated base film for a photographic film, which has a proper curling in the width direction which can be overcome by the contraction of a photosensitive emulsion, and which is excellent in transparency and lubricity.

It is further another object of the present invention to provide a laminated base film for a photographic film, which is excellent in anti-curling properties, i.e., the performance of resisting the formation of curling caused by curling tendency, and is excellent in transparency and lubricity.

It is further another object of the present invention to provide a laminated base film for a photographic film, which is formed from polyethylene-2,6-naphthalenedicarboxylate as a raw material.

It is further another object of the present invention to provide a laminated base film for a photographic film, which is excellent not only in the anti-curling properties, but also in the curl-curing property, i.e., the performance of easily curing the curl which has been once formed by the curling tendency.

It is further another object of the present invention to provide a laminated base film for a photographic film, which is excellent in the properties of resistance to peeling-off of layer (delamination) and scratch resistance.

Other objects and advantages of the present invention will be apparent from the following description.

According to the present invention, the above objects and advantages of the present invention are achieved, first, by a laminated base film for a photographic film, (A) which is a laminated film comprising a first layer composed essentially of polyethylene-2,6-naphthalenedicarboxylate and a second layer composed essentially of a polymer composition containing a 2,6-naphthalenedicarboxylate unit

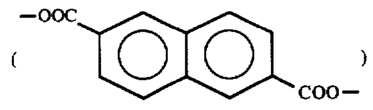

and an ethylene unit (—$CH_2CH_2$—) in a total amount of at least 50% by weight, and (B) which has a haze value of 3.0% or less, (C) in which the first layer has a plane orientation coefficient ($NS_1$) of 0.270 or less, and (D) in which the first layer thickness/second layer thickness ratio is in the range of from 3/7 to 7/3.

PREFERRED EMBODIMENTS FOR WORKING THE INVENTION

The laminated base film for a photographic film, provided by the present invention, is identified by the constitution requirements of (A) to (D) as described above.

First, in the requirement (A), the above base film of the present invention is a laminated film comprising a first layer and a second layer.

The first layer is composed essentially of polyethylene-2,6-naphthalenedicarboxylate.

As the polyethylene-2,6-naphthalenedicarboxylate, a homopolymer in which all the recurring units are ethylene-2,6-naphthalenedicarboxylate or a copolymer in which at least 97 mol % of all the recurring units are ethylene-2,6-naphthalenedicarboxylate is preferably used.

As a third component for constituting the copolymer, examples of a compound of which the molecule has two ester-forming functional groups include dicarboxylic acids such as oxalic acid, adipic acid, phthalic acid, isophthalic acid, terephthalic acid, 2,7-naphthalenedicarboxylic acid and diphenyl ether dicarboxylic acid; hydroxycarboxylic acids such as p-hydroxybenzoic acid and p-hydroxyethoxybenzoic acid; and dihydric alcohols such as propylene glycol, trimethylene glycol, tetramethylene glycol, hexamethylene glycol, cyclohexanedimethanol, neopentyl glycol and diethylene glycol.

Further, the polyethylene-2,6-naphthalenedicarboxylate may be one in which part or all of the terminal hydroxyl groups and/or carboxyl groups are blocked with a monofunctional compound such as benzoic acid or methoxypolyalkylene glycol, or may be one which is modified with a small amount of a trifunctional or more-functional compound such as glycerin or pentaerythritol to such an extent that a substantially linear polymer can be obtained.

As the polyethylene-2,6-naphthalenedicarboxylate, preferred is a homopolymer of which all the recurring units are composed essentially of ethylene-2,6-naphthalenedicarboxylate.

The above polyethylene-2,6-naphthalenedicarboxylate may contain additives such as a stabilizer, an ultraviolet light absorbent, a colorant and a flame retardant.

The polyethylene-2,6-naphthalenedicarboxylate forming the first layer may contain a small amount of inert fine particles, such as 0.2% by weight or less of inert fine particles having an average particle diameter of 0.05 to 1.5 μm.

As the above inert fine particles, those to be described later concerning the second layer are preferably used.

The second layer is composed essentially of a polymer composition containing 2,6-naphthalenedicarboxylate unit

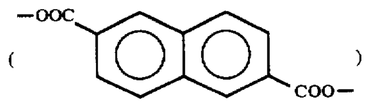

and an ethylene unit (—$CH_2CH_2$—) in a total amount of at least 70% by weight.

The above polymer composition may be, for example, a composition containing polyethylene-2,6-naphthalenedicarboxylate and other polymer, a copolyester formed from 2,6-naphthalenedicarboxylic acid as a main acid component and ethylene glycol as a main glycol component, or a composition containing the copolyester and other polymer.

The polyethylene-2,6-naphthalenedicarboxylate can be selected from those described concerning the first layer above. As the above copolyester, there is used a copolyester formed from 2,6-naphthalenedicarboxylic acid and other acid component in an amount of 40 mol % or less, preferably 20 mol % or less, based on the total acid component and ethylene glycol and other glycol component in an amount of 50 mol % or less, preferably 25 mol % or less, based on the total glycol component.

The acid component other than 2,6-naphthalenedicarboxylic acid and the glycol component other than ethylene glycol are selected from those described above. Further, the polyethylene-2,6-naphthalenedicarboxylate may be terminal-blocked with a monofunctional compound, or a trifunctional or more-functional compound may be copolymerized to such an extent that the resultant copolymer is substantially linear.

Further, the above "other" polymer includes a polyethylene terephthalate homopolymer, a polyethylene terephthalate copolymer in which at least 80 mol % of the acid component is terephthalic acid and at least 90 mol % of the glycol component is ethylene glycol, polycyclohexanedimethylene-2,6-naphthalenedicarboxylate, polybutylene terephthalate, polyamide, polyolefin and polycarbonate. Of these, preferred are polyethylene terephthalate and a polyethylene terephthalate copolymer.

The other acid component in an amount of less than 20 mol %, constituting the polyethylene terephthalate copolymer, is preferably selected from the above-described dicarboxylic acids other than terephthalic acid and 2,6-naphthalenedicarboxylic acid. For the other glycol component in a amount of less than 10 mol %, the above dihydric alcohols may be used.

The polymer composition constituting the second layer contains a 2,6-naphthalenedicarboxylate unit and an ethylene unit in a total amount of at least 70% by weight, preferably 75 to 99% by weight, more preferably 80 to 98.5% by weight.

The polymer composition for the second layer preferably comprises a combination of polyethylene-2,6-naphthalenedicarboxylate and other polymer. Further, the polymer composition for the second layer may contain a polymer composition which comprises components of the laminated base film of the present invention, e.g., a polymer composition comprising components recovered from the laminated base film of the present invention. When in the polymer composition comprising components of the laminated base film, the content of a unit other than the 2,6-naphthalenedicarboxylate and ethylene glycol units is smaller than an intended amount, other polymer may be properly combined to form a second polymer composition having desired compositions. The polymer composition forming the second layer may contain a small amount of inert fine particles, e.g., 0.001 to 0.2% by weight of inert fine particles having an average particle diameter of 0.05 to 1.5 μm.

Examples of the above inert fine particles include inorganic particles such as spherical silica particles, calcium carbonate, alumina and zeolite, and organic particles such as silicone resin particles and crosslinked polystyrene particles. When the inert fine particles are inorganic particles, synthetic inorganic particles are preferred, and they may have any form of crystals.

Of the above examples of the inert fine particles, spherical silica particles are one kind of preferred inert fine particles. Each of the spherical silica particles has a particle form close to a true sphere, and each particle diameter ratio (largest diameter/smallest diameter) is preferably in the range of from 1.0 to 1.2, more preferably 1.0 to 1.1, particularly preferably 1.0 to 1.05. The spherical silica particles are present in a monodisperse state, and for example, they do not mean spherical particles of primary particles forming aggregated particles. When this spherical form ratio increases, undesirably, voids are liable to occur around particles, and the formed voids become relatively large to increase the haze.

Silicone resin particles and crosslinked polystyrene particles are also other kinds of preferred inert fine particles.

As silicone resin particles, preferred are organopolysiloxane particles comprising structural units of which at least 80% by weight are represented by $CH_3.SiO_{3/2}$. This $CH_3.SiO_{3/2}$ structural unit has the following formula.

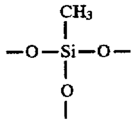

The above silicone resin particles can be also expressed as a three-dimensionally structured organopolysiloxane having structural units of which at least 80% by weight are represented by $(CH_3.SiO_{3/2})_n$. In the formula, the above n shows a polymerization degree, and is preferably at least 100. The other component is a difunctional organopolysiloxane or other trifunctional organosiloxane derivative.

The above silicone resin particles have characteristic features in that they are in excellent lubricity, have the specific gravity smaller than inorganic inert fine particles and exhibit excellent heat resistance over other organic fine particles. Further, they have characteristic features in that they are insoluble in an organic solvent and are infusible. Further, silicone resin particles exhibit excellent affinity to polyethylene-2,6-naphthalenedicarboxylate. The above silicone resin particles preferably have a volumetric shape coefficient of 0.20 to π/6. When the silicone resin particles have this characteristic, they serve to give a biaxially oriented film having further excellent lubricity, and the film is greatly improved in transparency due to the excellent affinity of the silicone resin particles to polyethylene-2,6-naphthalenedicarboxylate.

The crosslinked polystyrene particles preferably have a spherical form and a narrow particle size distribution. Concerning the form of each particle, the particle diameter ratio defined by a ratio of the largest diameter to the smallest diameter is preferably in the range of from 1.0 to 1.2, more preferably 1.0 to 1.15, particularly preferably 1.0 to 1.12.

The crosslinked polystyrene particles are not limited by their production process. For example, the spherical crosslinked polystyrene particles can be obtained by emulsion-polymerizing one or at least two monomers selected from styrene monomer, styrene derivative monomers such as a methyl styrene monomer, α-methylstyrene monomer and a dichlorostyrene monomer and others including a conjugated diene monomer of butadiene, unsaturated nitrile monomers such as acrylonitrile, methacrylate monomers such as methyl methacrylate, functional monomers such as unsaturated carboxylic acid, monomers having hydroxyl such as hydroxyethyl methacrylate, monomers having an epoxide group such as glycidyl methacrylate, and unsaturated sulfonic acid, and a polyfunctional vinyl compound as a crosslinking agent for forming the three-dimensional structure of each polymer particle, such as divinylbenzene, ethylene glycol dimethacrylate, trimethylolpropane triacrylate or diallyl phthalate, in an aqueous medium in which a water-soluble polymer is dissolved as a protective colloid, to prepare an emulsion of polymer particles, recovering the polymer particles from the emulsion, drying the polymer particles, milling them with a jet mill and classifying them.

The average particle diameter of the above inert fine particles is preferably in the range of from 0.05 to 1.5 μm. In particular, when the inert fine particles are inorganic particles, the average particle diameter is more preferably in the range of from 0.1 to 0.8 μm, particularly preferably 0.2 to 0.5 μm. When the inert fine particles are silicone resin particles, the average particle diameter is preferably in the range of from 0.1 to 1.5 μm, particularly preferably 0.2 to 1.3 μm. Further, when the inert fine particles are crosslinked polystyrene particles, the average particle diameter is preferably in the range of from 0.1 to 1 μm.

When the average particle diameter of the inert fine particles is smaller than 0.05 μm, undesirably, the effect on the improvement of the film in lubricity, abrasion resistance and take-up properties is small, whereas when the average particle diameter is greater than 1.5 μm, undesirably, the film has decreased transparency.

Concerning the particle size distribution of the inert fine particles, the relative standard deviation shown by the following equation is preferably 0.5 or less, more preferably 0.3 or less, particularly preferably 0.12 or less.

$$\text{Relative standard deviation} = \sqrt{\sum_{i=1}^{n} (D_i - D_a)^2/n} \Big/ D_a$$

wherein:

$D_i$ is a diameter (μm) equivalent to the diameter of area circle of each particle, $D_a$ is an average value of diameters equivalent to the diameters of area circles of the particles, $$D_a = \left( \sum_{i=1}^{n} D_i \right) / n \ (\mu m)$$

and n is the number of measured particles.

When inert fine particles having a relative standard deviation of 0.5 or less, the heights of film surface projections are very uniform since the particles are spherical and have an extremely sharp particle size distribution. Further, each projection formed on the film surface has a greatly sharp form so that the film has highly excellent lubricity.

The content of the inert fine particles is preferably 0.001 to 0.2% by weight. When the inert fine particles are inorganic particles, their content is preferably 0.001 to 0.1% by weight, particularly preferably 0.002 to 0.005% by weight.

When the inert fine particles are silicone resin particles, their content is preferably 0.001 to 0.1% by weight, more preferably 0.001 to 0.02% by weight, particularly preferably 0.001 to 0.01% by weight. When the inert fine particles are crosslinked polystyrene particles, their content is preferably 0.001 to 0.1% by weight, particularly preferably 0.001 to 0.05% by weight. When the content of the inert fine particles is less than 0.001% by weight, undesirably, the film is liable to show insufficient lubricity. On the other hand, it exceeds 0.2% by weight, undesirably, the film has increased haze so that the transparency is insufficient.

The time at which the inert fine particles are added is not specially limited if they are added at a stage before the film is formed. For example, the inert fine particles may be added at the stage of polymerization, or may be added to the polymer composition at a stage before the film is formed.

The laminated base film for a photographic film, provided by the present invention, has a haze value of 3.0% or less (Requirement (B)). The haze value is preferably 2.0% or less, more preferably 1.5% or less, particularly preferably 1.0% or less. When the haze value is too high, undesirably, the film has decreased transparency.

In the laminated base film of the present invention, the first layer has a plane orientation coefficient ($NS_1$) of 0.270 or less (Requirement (C)), preferably 0.260 or less. The plane orientation coefficient (NS) is defined by the following equation.

$$NS = \frac{n_x + n_y}{2} - n_z$$

wherein $n_x$ is a refractive index of a biaxially oriented film in the machine direction, $n_y$ is a refractive index in the direction which intersects at right angles with the machine direction (in the width direction), and $n_z$ is a refractive index in the film thickness direction.

When the plane orientation coefficient ($NS_1$) of the first layer exceeds 0.270, the plane orientation degree is high to excess so that the delamination is liable to occur in the film thickness direction.

In the laminated base film of the present invention, preferably, the difference between the plane orientation coefficient ($NS_2$) of the second layer and the plane orientation coefficient ($NS_1$) of the first layer ($\Delta NS = NS_1 - NS_2$) is in the range of from 0.002 to 0.200. When the ΔNS is in the above range, a curling easily formed by the film formation, and the film is easily formed.

In the laminated base film of the present invention, the ratio of the thickness of the first layer/the thickness of the second layer is between 3/7 and 7/3 (Requirement (D)), preferably between 3/7 and 1/1.

The laminated base film of the present invention can be advantageously produced by biaxially stretching an unstretched laminated film obtained by a general method, e.g. a co-extrusion method, heat-setting it, and optionally annealing it. The stretching can be carried out by a known method, the stretching temperature is generally between 80° and 140° C., the stretch ratio in the longitudinal direction is preferably 2.0 to 4.2, more preferably 2.5 to 4.0, and the stretch ratio in the transverse direction is preferably 2.5 to 4.3, more preferably 2.8 to 4.0 times. The obtained biaxially stretched film is heat-set at a temperature between 170° and 260° C., preferably between 180° and 250° C., for 1 to 100 seconds. The stretching may be carried out concurrently in the longitudinal and transverse directions with a general roll or stenter, or a method of consecutively stretching in the longitudinal direction and then in the transverse direction may be employed.

When the above biaxial stretching treatment and the above heat-setting treatment are carried out, the first layer and the second layer have a plane orientation difference due to a difference in stretching characteristics whereby a difference in shrinkage stress occurs, so that there is obtained a laminated polyester film which is curled with the first layer outside and the second layer inside.

In the heat-setting in the biaxially stretching, the heat-setting zone after the biaxially stretching is divided into multi-stages and the heat-setting temperatures are gradually decreased so that no sharp temperature change is caused, whereby an increased refractive index ($n_z$) in the thickness direction can be easily achieved without causing an increase in the thickness unevenness and the occurrence of creases. Further, this effect becomes more noticeable when the film is contracted in the width direction by decreasing the width of stenter rails in the heat-setting zone at a highest temperature.

For example, preferably, the heat-setting zone after the biaxial stretching is divided into at least three zones, preferably at least four zones, and the temperature in the final zone of the heat-setting zone is set at 140° C. or lower, preferably at 120° C. or lower.

In the course from a zone of a highest heat-setting temperature to the final zone, preferably, the temperature is gradually decreased so that no sharp temperature change is caused. In this case, the temperature gradient from one zone to a neighboring zone is set to be 70° C. or lower, preferably 60° C. or lower.

The laminated base film of the present invention can have the following preferred properties as a base film for a photographic film.

In the laminated base film of the present invention, preferably, the curl degree ($f_1$) in the width direction with the second layer inside is in the range of from 0.5 to 50%. That is, the laminated base film of the present invention has the property of curling in the width direction with the second layer inside, and its degree in the value of the curl degree ($f_1$) is in the range of from 0.5 to 50%. The laminated base film of the present invention, which exhibits this curl degree ($f_1$), is proper, since, when a photosensitive emulsion is applied to the first layer side thereof, the curling is sufficiently offset by the contraction of the emulsion when the it is dried.

The refractive index nz in the thickness direction of the first layer of the laminated base film for a photographic film, provided by the present invention, is preferably at least 1.493. When this refractive index is less than 1.493, improperly, the film is liable to undergo delamination, scratching is liable to form a scratch having notches (ruggedness), and the delamination portion or this scratch is conspicuous in white.

The above refractive index (nz) in the film thickness direction is a value determined with an Abbe refractometer using Na-D ray at 25° C.

The refractive index (nz) can be increased by decreasing the film stretching ratio and increasing the film heat-setting temperature. However, when the stretch ratio is decreased to excess or when the heat-setting temperature is increased to excess, the thickness unevenness of the film increases to cause a crease (flute) on the film surface.

The refractive index (nz) is preferably 1.495 or more, more preferably 1.510 or less.

In the laminated base film of the present invention, the film/film sticking degree is preferably grade 3 or lower, more preferably grade 2.5 or lower, particularly preferably grade 2 or lower. With this grade of the sticking degree increases, the lubricity of the film decreases. When this grade decreases, the film/film lubricity tends to increase. When this sticking degree is higher than grade 3, the film/film lubricity is poor, the film/film blocking is liable to occur, the film is liable to be scratched by a carrying roll when the tape is running, and when the film is taken up in the form of a roll, the roll is liable to have a bump-like projection, which are undesirable for the use of the film as a photographic film.

In the laminated base film of the present invention, the curl degree ($f_2$) in the longitudinal direction with the second layer outside after the film is taken up with the first layer inside, is preferably in the range of from 0 to 70%.

The laminated base film of the present invention, having the above properties, i.e. a curl degree ($f_2$) in the longitudinal direction in the range of from 0 to 70%, can be advantageously produced by biaxially stretching an unstretched laminated film obtained by a general method, heat-setting it and then annealing it.

The annealing treatment method for the biaxially stretched film includes a method in which the biaxially stretched and heat-set film is heated with keeping it in contact with a heating roll without taking it up, a method in which the above film is heated in a non-contact state while it is carried with hot air, a method in which a once taken-up film is heated in the same manner as above while it is unwound, and a method in which a taken-up film is heat-treated in a heating oven while it is in the form of a roll.

More effective and preferred is a method in which the film in a roll state is annealed at a temperature which is higher than a temperature at which the film has heat history and is 150° C. or lower, or more preferably at a temperature which is higher, by 10° C., than a temperature at which the film has heat history and is 130° C. or lower. When the film in a roll state is annealed at a temperature equal to, or lower than, a temperature at which the film has heat history, it is insufficient to prevent the curling tendency. When the annealing treatment is carried out at a temperature higher than 150° C., undesirably, oligomers are liable to precipitate on the film surface and imprinting of a core on the film surface is liable to occur, which are disadvantageous for the use of the film.

In the laminated base film of the present invention, the flatness is preferably 250 cm/m width or less. When the film flatness exceeds 250 cm/m width, improperly, it is difficult to apply a photosensitive emulsion uniformly. The flatness is particularly preferably 200 cm/m width or less.

The laminated base film of the present invention may have a thickness unevenness, preferably, of 5 μm or less, more preferably, of 4 μm or less. When the thickness unevenness exceeds 5 μm, it is difficult to apply a photosensitive emulsion to the film surface uniformly to decrease the product quality of a photographic film in some cases.

For decreasing the thickness unevenness, it is effective to increase the stretch ratio and decrease the heat-setting temperature, the temperature for stretching in the longitudinal direction and the temperature for stretching in the transverse direction.

Further, in the laminated base film of the present invention, the Young's moduli in the two directions crossing at right angles are preferably 750 $kg/mm^2$ or less, more preferably 700 $kg/mm^2$ or less. When this Young's modulus exceeds 750 $kg/mm^2$, a large amount of dust is liable to occur when the film is cut or perforated. The lower limit of each of the Young's moduli in the longitudinal and transverse directions is preferably 400 $kg/mm^2$, more preferably 450 $kg/mm^2$.

Although not specially limited, the difference between the Young's moduli in these two directions is preferably 150 $kg/mm^2$ or less.

The laminated base film of the present invention has a thickness, preferably, of 40 to 120 μm, more preferably, of 50 to 100 μm.

The laminated base film of the present invention can be converted to a photographic film by forming various thin layers including a photosensitive emulsion layer.

EXAMPLES

The present invention will be explained more in detail with reference to Examples hereinafter, while the present invention shall not be limited to these Examples.

Various physical property values were measured as follows.

(1) Plane Orientation Coefficient

A film sample was measured for refractive index through each surface at 25° C. using Na-D ray as a light source. The sample film was measured with regard to two surfaces of a first layer and second layer, and the plane orientation degree ($NS_1$) of the first layer and the plane orientation degree ($NS_2$) of the second layer were determined on the basis of the following equation.

$$NS = \frac{n_x + n_y}{2} - n_z$$

(2) Haze

Total haze value per one sheet of a film, measured with a commercially available haze meter according to the method of JIS K-6714.

(3) Curl Degree ($f_1$) in Width Direction

A test piece having a length of 120 mm and a width of 35 mm was taken from a film immediately after the film was formed, and perpendicularly suspended, and it was measured for a length X (mm) of a chord in a curling state. The proportion (%) of the chord length to the sample length 120 mm was calculated on the basis of the following equation to determine the curl degree.

$$\text{Curl degree } f_1\ (\%) = \frac{120 - X}{120} \times 100$$

A curling with a second layer inside was taken as +, and a curling with a first layer inside was taken as −. The test piece was evaluated as follows.

○: $+0.5 \leqq$ curl degree $f_1 \leqq +50$

Δ: $+0 <$ curl degree $f_1 < +0.5$ or $+50 <$ curl degree $f_1$

X: $+0 \geqq$ curl degree $f_1$ (4) Curl Degree ($f_2$) in the Longitudinal Direction A sample film having a size of 120 mm×35 mm was wound around a core having a diameter of 10 mm, with a first layer inside, and temporarily fixed so that it was not unwound. The wound sample film was heated at 70° C. at 30% RH for 72 hours, then released from the core, and immersed in distilled water at 40° C. for 15 minutes. Then, the sample was perpendicularly suspended with a load of 50 g and measured for a "sample length" X (mm) in a state where the curling remained. The proportion (%) of the sample length in a curling state to the sample length in the beginning 120 mm was taken as a curl degree $f_2$ in the longitudinal direction.

$$\text{Curl degree } f_2\ (\%) = \frac{120 - X}{120} \times 100$$

The above "sample length" refers to a diameter when the sample greatly curls to show the form of a circle or a semicircle, and refers to a chord length when the sample curls in a small degree to show a form short of a semicircle.

The performance of removing a curling shows better as the curl degree in the longitudinal direction comes close to zero (0).

(5) Sticking Degree

A rubber plate was placed on a flat bed, and two films were stacked such that neither dust nor soil was not present therebetween and were placed thereon. A cylindrical weight having an outer diameter of 70 mm and a weight of 10 kg was gently placed on the film from right above, and gently removed after 10 minutes. The films were allowed to stand for 30 seconds, and then a contact pattern in a circle formed by the cylinder was photographically projected to measure a ratio of area of a sticking portion. The sticking degree was rated on the basis of the five grades shown in Table A.

TABLE A

| Grade | Ratio (%) of sticking portion |
|---|---|
| 0 | less than 10% |
| 1 | at least 10%, less than 30% |
| 2 | at least 30%, less than 50% |
| 3 | at least 50%, less than 70% |
| 4 | at least 70%, less than 90% |
| 5 | at least 90% |

(6) Flatness

A film sample having a length of 2 m was taken from a film roll, and spread over a horizontal and flat bed such that the side of the film sample which had formed the roll film surface faced upwardly. After the film sample was allowed to be spread for 10 minutes, the film sample surface was thoroughly observed to measure lengths (cm) of creases (flutes) remaining on the surface. The total of the measured lengths was divided by the film width (m) to calculate the flatness.

$$\text{Flatness (cm/m width)} = \frac{\text{Total of flutes lengths (cm)}}{\text{Film width (m)}}$$

(7) Thickness Unevenness of Film

A film sample was measured through a length of 2 m each in the longitudinal direction and in the transverse direction, with an electronic micrometer K-312 model supplied by Anritsu K.K. at a probe pressure of 30 g at a running rate of 25 mm/second, to prepare a continuous thickness chart based on the sensitivity of ±4 μm. The largest value and the smallest value of the thickness through a length of 2 m were determined from this chart, and a difference R (μm) between these values was taken as a thickness unevenness.

(8) Young's Modulus

A film was cut to prepare a sample having a width of 10 mm and a length of 15 cm, and the sample was tensioned with an Instron type universal tensile tester at a distance of 100 mm between chucks, at a tension rate of 10 mm/minute and at a charting rate of 500 mm/minute. The Young's modulus was calculated on the basis of a tangent in a rising portion of the obtained load-elongation curve.

(9) Folding Line Delamination Whitening Percentage

A film sample having a size of 80 mm×80 mm was taken, manually gently folded into two portions with the first layer outside, placed between a pair of flat metal plates, and then pressed with a pressing machine under a predetermined pressure $P_1$ (kg/cm$^2$G) for 20 seconds. The pressed two-folded film was manually brought back into its original state, placed between the above metal plates and pressured under a pressure P1 (kg/cm$^2$G) for 20 seconds. Then, the sample was taken out, and whitened portions appearing in the folding line were measured for lengths (mm) to calculate their total.

The above measurement was repeated under a pressure $P_1$ of 1, 2, 3, 4, 5 or 6 (kg/cm$^2$G) using a fresh film sample for each measurement.

The percentage of the average of total of lengths (mm) of whitened portions under the pressures to the total length (80 mm) of the folding line was taken as a folding line delamination whitening percentage, and this value was used as an index showing how easily the film underwent delamination.

$$\text{Folding line delamination whitening percentage} = \frac{\text{Total of lengths of whitened portions (mm)}}{80\text{ mm} \times 6} \times 100$$

(10) Average Particle Diameter of Particles

Particles were measured with a CP-50 model centrifugal particle size analyzer supplied by Shimadzu Corporation. On the basis of the resultant centrifugal sedimentation curve, there was prepared a cumulative curve showing particle diameters and amount of particles having the particle diameters. In the cumulative curve, a particle diameter corresponding to a 50 mass percent was read, and this particle diameter value was defined as an average particle diameter (see "Particle Size Measurement Technique", issued by Nikkan Kogyo Press, 1975, pages 242 to 247).

(11) Volumetric Shape Coefficient (f)

Photographs of 10 fields of view of lubricant particles were taken through a scanning electron microscope at a magnification ratio of 5,000 times, and an average of largest diameters was calculated per field of view with an image analysis processing apparatus Luzex 500 (supplied by Nihon Regulator Co., Ltd). Further, an average of those in the 10 fields of view was determined, and taken as D.

The volume of a particle was calculated on the basis of $V=(\pi/6)d^3$ using the average particle diameter d of particles obtained in the above item (10), and the volumetric shape coefficient f was calculated on the basis of the following equation.

$$f=V/D^3$$

in which B is a particle volume ($\mu m^3$) and D is a largest particle diameter (μm).

(12) Particle Diameter Ratio

A small piece of a film was fixed by molding an epoxy resin, and an ultrathin piece having a thickness of about 600 angstroms (cut in parallel with the film flow direction) was prepared with a microtome. This sample was observed for cross-sectional forms of lubricants in the film through a transmission type electron microscope (H-800 model supplied by Hitachi Ltd.), and the ratio of the largest particle diameter and the smallest particle diameter was shown.

(13) Average Particle Diameter, Particle Diameter, etc.

Particles were spread on the sample bed of an electronic microscope such that fewest particles were stacked on another, and a thin deposition layer having a thickness of 200 to 300 angstroms was formed on the surface of the particles with a metal sputtering apparatus. The surface was observed through a transmission type electron microscope at a magnification of 10,000 to 30,000 times to determine largest diameters (D1i), smallest diameters (Dsi) and area circle equivalents (Di) of at least 100 particles with Luzex 500 supplied by Nippon Regulator K.K. These number averages calculated on the basis of the following equations were taken as a largest diameter (D1), a smallest diameter (Ds) and an average particle diameter (Da). Further, the particle diameter ratio was determined on the basis of these.

$$Dl=\left(\sum_{i=1}^{n} Dli\right)/n,\quad Ds=\left(\sum_{i=1}^{n} Dsi\right)/n$$

$$Da=\left(\sum_{i=1}^{n} Di\right)/n,$$

Further, particles in a film were determined as follows.

A small piece of a sample film was fixed on a sample bed of a transmission type electron microscope, and the film surface was ion-etched with a sputtering apparatus (JFC-1100 model ion-etching apparatus) supplied by Nippon Denshi K.K. under the following conditions. The sample was placed in a bell jar, and the vacuum degree was increased up to a vacuum state around $10^{-3}$ Torr. The ion-etching was carried out at a voltage of 0.25 KV, at a current of 125 mA for about 10 minutes. Further, the film surface was sputtered with gold with the same apparatus, and observed through a transmission type electron microscope at a magnification of 10,000 to 30,000 times to determine largest diameters (D1i), smallest diameters (Dsi) and area circle equivalents (Di) of at least 100 particles with Luzex 500 supplied by Nihon Regulator Co., Ltd. The procedures thereafter were carried out in the same manner as above.

EXAMPLE 1

Polyethylene-2,6-naphthalenedicarboxylate containing 0.01% by weight of silica particles having an average particle diameter of 0.5 μm was used as raw material (A). On the other hand, a composition obtained by blending raw material (A) with 10% by weight of polyethylene terephthalate (α component) as a component other than the polyethylene-2,6-naphthalenedicarboxylate was used as raw material (B). These raw materials (A) and (B) were separately dried, extruded through different melt-extruders and laminated by a co-extrusion method to form an unstretched film having a thickness constitution ratio of 50:50. This unstretched film was consecutively biaxially stretched 3.0 times in the longitudinal direction (machine direction) and 3.1 times in the transverse direction (width direction), and then the laminated film was heat-set at 220° C. for 30 seconds while it was held in a constant length, to give a laminated biaxially oriented polyester film having a thickness of 100 μm. A film having a width of 500 mm and a length of 500 mm was sampled from the obtained biaxially oriented film, taken up around a core having a diameter of 165 mm to prepare a sample roll, and the sample roll was annealed in this sate by increasing the temperature up to 100° C. over 24 hours, maintaining it for 24 hours and decreasing the temperature to room temperature over 24 hours. The physical properties of the annealed biaxially oriented film were as shown in Table 1.

EXAMPLES 2 AND 3

Example 1 was repeated except that the weight % of polyethylene terephthalate to be blended with the raw material (A) in the composition (B) was changed to 30% (Example 2) or 50% (Example 3) and that the silica particles were changed to 0.01% by weight of silica particles having an average particle diameter of 0.3 μm. Table 1 shows the results.

EXAMPLE 4

Example 1 was repeated except that the thickness constitution ratio was changed to 33:67. Table 1 shows the results.

EXAMPLE 5

Example 1 was repeated except that the thickness constitution ratio was changed to 67:33 and that the lubricant was changed to 0.01% by weight of silicone resin particles having an average particle diameter of 0.5 μm. Table 1 shows the results.

EXAMPLE 6

Example 1 was repeated except that the component other than the polyethylene-2,6-naphthalenedicarboxylate, to be blended with the raw material (A) in the composition (B) was replaced with 5% by weight of polycarbonate. Table 1 shows the results.

COMPARATIVE EXAMPLE 1

A film having a thickness of 100 μm was prepared from raw material (A) alone in the same manner as in Example 1. Table 1 shows the results.

COMPARATIVE EXAMPLE 2

Example 1 was repeated except that the unstretched film was consecutively biaxially stretched 4.8 times in the longitudinal direction and 5.1 times in the transverse direction. Table 1 shows the results.

COMPARATIVE EXAMPLE 3

Example 1 was repeated except that the silica particles were changed to 0.30% by weight of titanium dioxide particles having an average particle diameter of 0.3 μm.

EXAMPLE 7

Example 1 was repeated except that the component other than the polyethylene-2,6-naphthalenedicarboxylate, to be blended with the raw material (A) in the composition (B) was replaced with 25% by weight of polycyclohexanedimethylene-2,6-naphthalenedicarboxylate and that the silica particles were changed to 0.01% by weight of silica particles having an average particle diameter of 0.3 μm. Table 1 shows the results.

TABLE 1

| | Example 1 | Example 2 | Example 3 | Example 4 |
|---|---|---|---|---|
| α-component | poly-ethylene tele-phthalate | poly-ethylene tele-phthalate | poly-ethylene tele-phthalate | poly-ethylene tele-phthalate |
| Amount of α-component in blend (wt %) | 10 | 30 | 50 | 10 |
| Layer thickness constitution 1st layer/2nd layer | 1:1 | 1:1 | 1:1 | 1:2 |
| Particles added | | | | |
| kind | silica | silica | silica | silica |
| particle diameter (μm) | 0.5 | 0.3 | 0.3 | 0.5 |
| amount (wt %) | 0.01 | 0.01 | 0.01 | 0.01 |
| Stretch ratio (Longitudinal × transverse) | 3.0 × 3.1 | 3.0 × 3.1 | 3.0 × 3.1 | 3.0 × 3.1 |
| Plane orientation coefficient | | | | |
| $NS_1$ | 0.237 | 0.245 | 0.256 | 0.235 |
| $NS_2$ | 0.222 | 0.116 | 0.110 | 0.220 |
| ΔNS | 0.015 | 0.129 | 0.146 | 0.015 |
| Haze value (%) | 1.6 | 1.4 | 1.2 | 1.2 |
| Folding line delamination whitening percentage (%) | 0 | 0 | 0 | 0 |
| Curl degree $f_1$ (%) in transverse direction | 5 | 30 | 35 | 10 |
| Curl degree $f_2$ (%) in longitudinal direction | 10 | 10 | 20 | 10 |
| Sticking degree | 2 | 2 | 2 | 2 |
| Overall evaluation | ○ | ○ | ○ | ○ |

TABLE 1-continued

| | Example 5 | Example 6 | Example 7 |
|---|---|---|---|
| α-component | poly-ethylene tele-phthalate | poly-carbonate | poly-hexane-di-methylene-2,6-naph-thalene-dicarbo-xylate |
| Amount of α-component in blend (wt %) | 10 | 5 | 25 |
| Layer thickness constitution 1st layer/2nd layer | 2:1 | 1:1 | 1:2 |
| Particles added | | | |
| kind | silicone | silica | silica |
| particle diameter (μm) | 0.5 | 0.5 | 0.3 |
| amount (wt %) | 0.01 | 0.01 | 0.01 |
| Stretch ratio (Longitudinal × transverse) | 3.0 × 3.1 | 3.0 × 3.1 | 3.0 × 3 |
| Plane orientation coefficient | | | |
| $NS_1$ | 0.239 | 0.240 | 0.227 |
| $NS_2$ | 0.225 | 0.230 | 0.202 |
| ΔNS | 0.014 | 0.010 | 0.025 |
| Haze value (%) | 1.2 | 1.2 | 1.8 |
| Folding line delamination whitening percentage (%) | 0 | 0 | 0 |
| Curl degree $f_1$ (%) in transverse direction | 3 | 5 | 20 |
| Curl degree $f_2$ (%) in longitudinal direction | 10 | 10 | 10 |
| Sticking degree | 2 | 2 | 2 |
| Overall evaluation | ○ | ○ | ○ |

| | Comp. Example 2 | Comp. Example 3 |
|---|---|---|
| α-component | poly-ethylene tele-phthalate | poly-ethlene tele-phthalate |
| Amount of α-component in blend (wt %) | 10 | 10 |
| Layer thickness constitution 1st layer/2nd layer | 1:1 | 1:1 |
| Particles added | | |
| kind | silica | titanium dioxide |
| particle diameter (μm) | 0.5 | 0.3 |
| amount (wt %) | 0.01 | 0.30 |
| Stretch ratio (Longitudinal × transverse) | 4.8 × 5.1 | 3.0 × 3.1 |
| Plane orientation coefficient | | |
| $NS_1$ | 0.275 | 0.237 |
| $NS_2$ | 0.230 | 0.222 |
| ΔNS | 0.045 | 0.015 |
| Haze value (%) | 1.9 | 3.7 |
| Folding line delamination whitening percentage (%) | 90 | 0 |
| Curl degree $f_1$ (%) in transverse direction | 5 | 5 |
| Curl degree $f_2$ (%) in longitudinal direction | 10 | 10 |
| Sticking degree | 2 | 1 |
| Overall evaluation | × | × |

EXAMPLES 8–10 AND COMPARATIVE EXAMPLES 5

Polyethylene-2,6-naphthalenedicarboxylate containing 0.01% by weight of silica particles having an average particle diameter of 0.5 μm was used as raw material (A). On the other hand, a composition obtained by blending raw material (A) with 10% by weight of polyethylene terephthalate (α component) as a component other than the polyethylene-2,6-naphthalenedicarboxylate was used as raw material (B). These raw materials (A) and (B) were separately dried, extruded through different melt-extruders and laminated by a co-extrusion method to form an unstretched film having a thickness constitution ratio of 50:50. This unstretched film was biaxially stretched and heat-treated under the conditions shown in Table 2, to give a biaxially oriented film having a thickness of 75 μm. The heat treatment was carried out with an apparatus of which the heat-treating zone was divided into four zones of $X_1$, $X_2$, $X_3$ and $X_4$, and in the zone ($X_1$) in which the heat-setting temperature was the highest, the stenter was arranged such that the film was contracted in the film width direction by narrowing the width of stenter rails.

Each of the so-obtained biaxially oriented films was measured for Young's moduli in the longitudinal and transverse directions, a refractive index (nz) in the thickness direction, thickness unevenness in the longitudinal and transverse directions, a flatness and a folding line delamination whitening percentage.

The results were as shown in Table 2.

TABLE 2

| | Example 8 | Example 9 | Example 10 | Comp. Example 5 |
|---|---|---|---|---|
| Longitudinal stretching | | | | |
| Stretch ratio | 2.7 | 3.0 | 3.0 | 4.8 |
| Temperature | 135 | 135 | 135 | 135 |
| Transverse stretching | | | | |
| Stretch ratio | 3.0 | 3.3 | 3.0 | 5.1 |
| Temperature | 145 | 145 | 145 | 145 |
| Heat-setting zone | | | | |
| $X_1$: Temperature (°C.) | 230 | 240 | 240 | 230 |
| Contraction ratio (%) | 6 | 0 | 6 | 6 |
| $X_2$: Temperature (°C.) | 200 | 215 | 215 | 200 |
| $X_3$: Temperature (°C.) | 170 | 180 | i80 | 170 |
| $X_4$: Temperature (°C.) | 110 | 110 | 110 | 110 |
| Young's modulus (μg/mm²) | | | | |
| Longitudinal direction | 580 | 600 | 600 | 700 |
| Transverse direction | 600 | 620 | 600 | 760 |
| Haze value (%) | 1.6 | 1.6 | 1.6 | 1.9 |
| | 0.230 | 0.241 | 0.237 | 0.275 |
| Refractive index nz | 1.499 | 1.503 | 1.506 | 1.488 |
| Unevenness in longitudinal direction (μm) | 3.6 | 4.8 | 3.8 | 2.7 |
| Unevenness in transverse direction (μm) | 3.5 | 4.6 | 3.8 | 2.7 |
| Flatness (mm/m width) | 80 | 230 | 120 | 40 |
| Folding line delamination whitening percentage (%) | 0 | 0 | 0 | 90 |
| Overall evaluation | ○ | ○ | ○ | × |

What is claimed is:

1. A laminated base film for a photographic film, (A) which is a laminated film comprising a first layer composed essentially of polyethylene-2,6-naphthalenedicarboxylate and a second layer composed essentially of a polymer composition containing a 2,6-naphthalenedicarboxylate unit

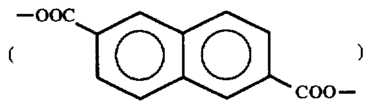

and an ethylene unit ($-CH_2CH_2-$) in a total amount of at least 50% by weight, and (B) which has a haze value of 3.0% or less, (C) in which the first layer has a plane orientation coefficient $NS_1$ of 0.270 or less, and (D) in which the first layer thickness/second layer thickness ratio is in the range of from 3/7 to 7/3;

wherein a difference ΔNS between a plane orientation coefficient $NS_2$ of the second layer and the plane orientation coefficient $NS_1$ of the first layer is in the range of from 0.002 to 0.200; and wherein the laminated base film curls with the first layer inside and the second layer outside, in the longitudinal direction, and the laminated base film has a curl degree $f_2$ in the longitudinal direction in the range of from 0 to 70%.

2. The laminated base film of claim 1, wherein the polymer composition for the second layer contains a combination of polyethylene-2,6-naphthalenedicarboxylate and another polymer.

3. The laminated base film of claim 1, wherein said second layer comprises a polymer composition containing said laminated base film which has been recycled.

4. The laminated base film of claim 1, wherein the haze value is 2.0% or less.

5. The laminated base film of claim 1, wherein the first layer has a plane orientation coefficient $NS_1$ of 0.260 or less.

6. The laminated base film of claim 1, wherein the first layer/second layer thickness ratio is in the range of from 3/7 to 1/1.

7. The laminated base film of claim 1, wherein the laminated base film curls with the second layer inside, in the width direction, and the laminated base film has a curl degree $f_1$ in the width direction in the range of from 0.5 to 50%.

8. The laminated base film of claim 1, wherein the laminated base film has a refractive index nz of at least 1.493 in the thickness direction.

9. The laminated base film of claim 1, wherein the laminated base film has a sticking degree of grade 3 or less.

10. The laminated base film of claim 1 wherein the laminated base film has a flatness of 250 cm/m width or less.

11. The laminated base film of claim 1, wherein the laminated base film has a thickness uneveness of 5 μm or less in one direction.

12. The laminated base film of claim 1, wherein the laminated base film has two directions crossing each other at right angles and wherein the Young's modulus in each direction is 750 kg/mm² or less.

13. The laminated base film of claim 1, wherein the first layer further comprises inert fine particles having an average particle diameter of 0.05 to 1.5 μm in an amount of 0 to not more than 0.2% by weight, and the second layer further comprises inert fine particles having an average particle diameter of 0.05 to 1.5 μm in an amount in the range of from 0.001 to 0.2% by weight.

14. The laminated base film of claim 1, wherein the laminated base film has a total thickness of 40 to 120 μm.

* * * * *